Figure 3:
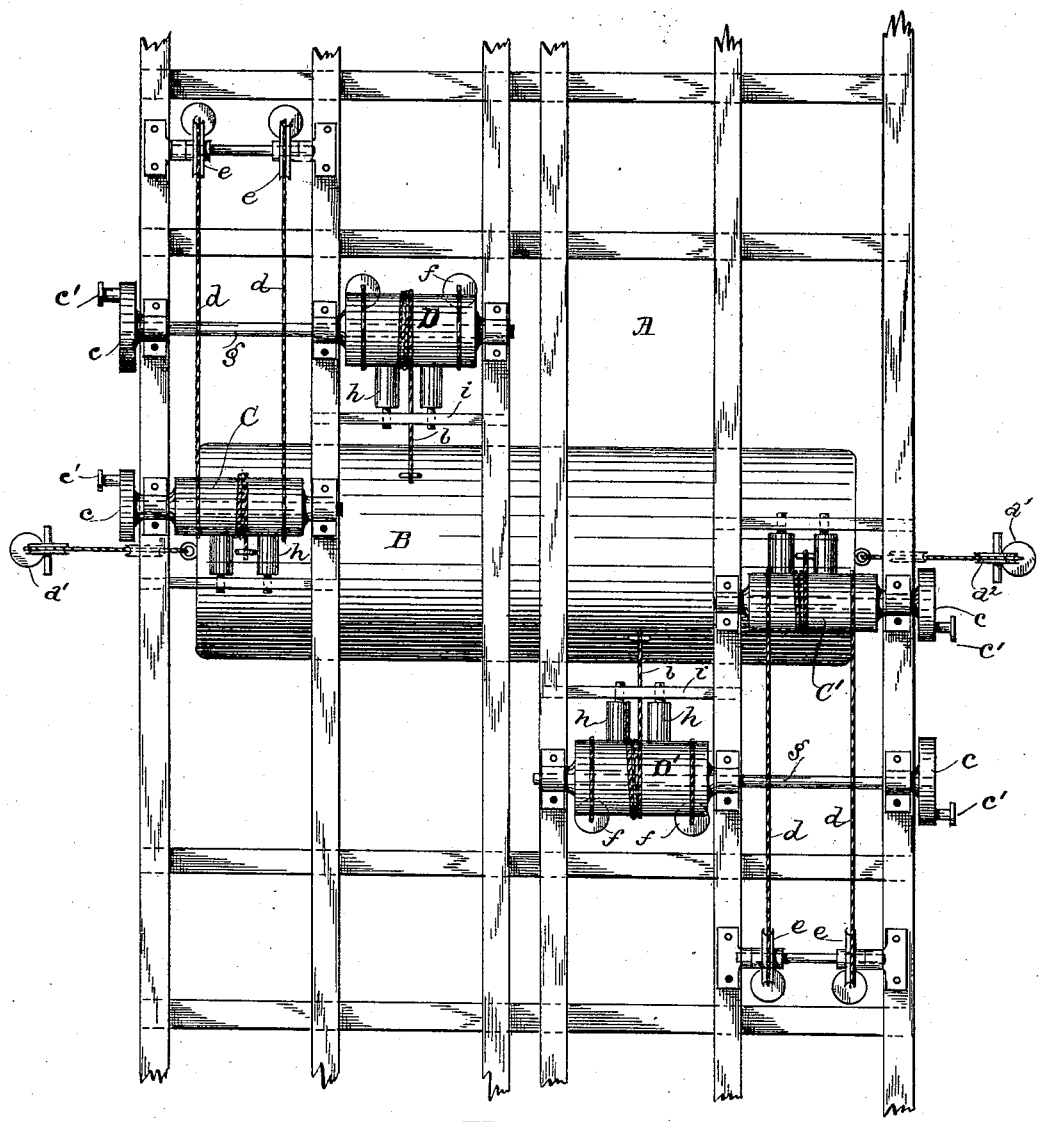

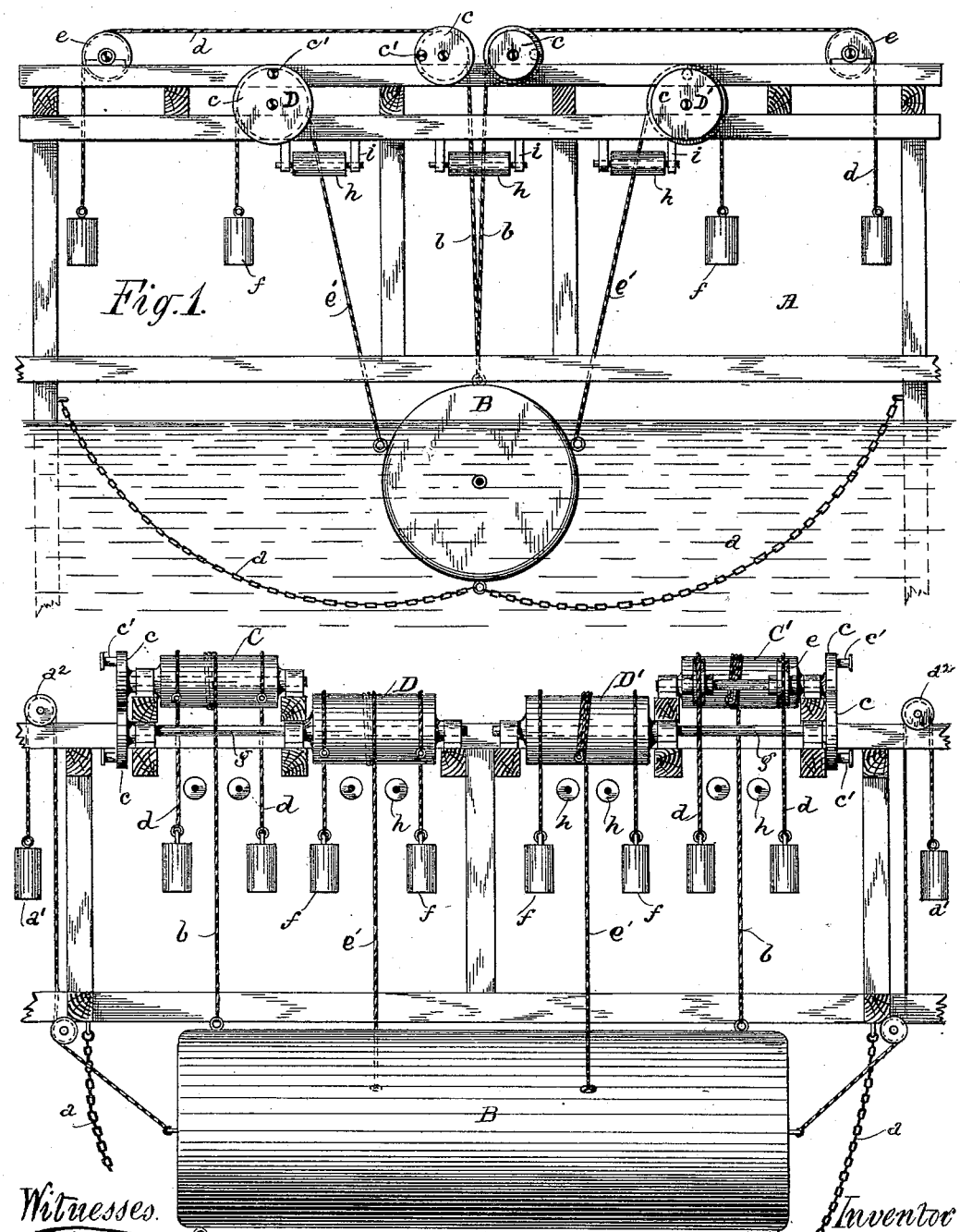

(No Model.) 2 Sheets—Sheet 2.

H. P. HOLLAND.
WAVE POWER MOTOR.

No. 454,821. Patented June 23, 1891.

Witnesses. Inventor

United States Patent Office.

HENRY P. HOLLAND, OF SAN FRANCISCO, CALIFORNIA, ASSIGNOR OF ONE-HALF TO J. A. FICHER, OF SAME PLACE.

WAVE-POWER MOTOR.

SPECIFICATION forming part of Letters Patent No. 454,821, dated June 23, 1891.

Application filed September 24, 1890. Serial No. 365,941. (No model.)

*To all whom it may concern:*

Be it known that I, HENRY P. HOLLAND, a citizen of the United States, residing at San Francisco, in the county of San Francisco and State of California, have invented certain new and useful Improvements in Wave-Power Motors; and I do hereby declare the following to be a full, clear, and exact description of said invention, such as will enable others skilled in the art to which it most nearly appertains to make, use, and practice the same.

This invention relates to that class of apparatus commonly known as "wave-power motors," in which the motion of the waves is transmitted through the hereinafter-described form of connected mechanism for the production and transmission of power for mechanical and other purposes.

The object of the invention is to provide a simple, efficient, and easily-constructed wave-power, in which all the motions of the waves, whether regular or irregular, horizontal or vertical, will be utilized, and which will consequently prevent the loss of motion inseparable from all apparatus of this class with which I am acquainted.

The apparatus which I have devised to accomplish this object consists, essentially, in a buoyant float confined within a suitable open structure built in and above the water and connected to mechanism mounted upon said structure. The float is so suspended as to be permitted to move freely either vertically or horizontally and to be tossed about irregularly by the waves, which have full access to it, and all of these motions are transmitted to the mechanism mounted above and connected to the float, and thus converted into power for general or special purposes.

For a full comprehension of my invention reference must be made to the accompanying drawings, in which—

Figure 1 is an end elevation. Fig. 2 is a front elevation. Fig. 3 is a plan view.

The letter A indicates an open structure or pier built out in and above the water and composed of upright and horizontal timbers of sufficient strength to sustain the power-transmitting devices carried by it. The pier is a skeleton structure open at all sides to give free access to the waves. Within the structure and suspended as hereinafter described is a buoyant float B, preferably a hollow shell of any desired cross-section, but shown as cylindrical. This shell, which is preferably constructed from boiler-iron, is permitted a free movement horizontal, vertical, and irregular, its horizontal swing, however, being limited by loose chains $a\ a$, secured to its ends and to the pier. It is also provided at each end with a counter-weight $a'$, suspended by a rope or cable and passing over guide-sheaves $a^2$.

I have provided connection from the float, by means of which all the motions given to it will be transmitted. Its direct vertical movement is conveyed by a pair of cables $b\ b$, one of which is secured to an eyebolt near each end of said float, Fig. 2, and which pass up through the pier to the top, where each is given several turns on one of the power-drums C C'. These drums are journaled in bearings upon longitudinal timbers of the pier, and such journals are provided with crank-disks $c$, having wrist-pins $c'$. The cables $b\ b$, after being given these turns on their drums, are secured to the latter, and counterbalancing weighted cables $d\ d$ are carried from each drum over loose sheaves $e\ e$ at the front and rear of the pier. The vertical lift of the float will thus transmit an oscillatory motion to the drums C C' and thereby to the crank-disks $c$. When the whole float is raised vertically the motion will be transmitted to both drums simultaneously. Should only one end of the float be raised the drum connected to that end will be operated. Should one end of the float rise and the other fall both drums will evidently be turned. The weight of the buoyant float is about double that of all the weights. Consequently, while resting in smooth water, the weights serve to counterbalance the float. However, as the float is lifted by the wave the weight adds to its upward movement and causes the unwinding of cables $d$ from C C', and winding therearound of cables $b$, which causes rotation of the drums. Upon the receding of the waves the gravity of the float overcomes the combined weight of the weights and causes the unwinding of cables $b$ and winding of cables $d$, thereby causing rotation of the drums in an opposite direction. It is thus obvious that with up-and-down motion of the waves, however slight, the drums will be caused to oscillate.

It will be seen that the drums C C′ for transmitting the vertical motion of the float are located directly above the same. In order to transmit the horizontal motion of the float, however, I employ two drums D D′, journaled nearer the middle longitudinal line of the pier, so that they are arranged at an oblique line with reference to the float. It will thus be seen that the drums D D′ are not vertically over the float but a certain distance laterally to each side thereof, and being so located the horizontal motion may be readily transmitted. Each cables e′ e′ pass up over and around their drums in the manner before described, and the counter-weights f f are in this case suspended directly from their drums, Fig. 1, without intervening sheaves. The horizontal swing or motion of the float, and to some extent its vertical rise and fall also, will convey to these drums D D′, the same oscillatory motion previously described. One of the journals g of each drum D and D′ is extended to the outer edge of the pier, where it is provided with a bearing, as well as with a crank-disk carrying a wrist-pin like those previously described. All the cables b b′ e′ e′ are guided by rollers h, Fig. 2, arranged in pairs and journaled in hangers i, Fig. 1, these guides or other suitable device being necessary in order to prevent the displacement of the cables on the drums.

It will of course be understood that I do not limit myself to the use of crank-disks for transmitting the oscillatory motion of the drums. I have illustrated these devices because they afford a practical means of converting these oscillations into a direct reciprocating motion; but other means of conversion well known in mechanics may be substituted for them when the conditions under which the invention is used require it or make it desirable.

I am aware that minor changes may be made in the arrangement of parts and details of construction herein shown and described without creating or necessitating a departure from the nature or scope of my invention.

Having thus described my invention, what I claim as new, and desire to secure protection in by Letters Patent of the United States, is—

1. A wave-power consisting of an open structure or pier, a buoyant float confined therein, but having a free movement in all directions, and power-drums connected to said float and deriving an oscillatory motion therefrom, substantially as set forth.

2. A wave-power consisting of an open structure or pier, a buoyant float exposed to the action of the waves and having a free movement in all directions, power-drums journaled in the pier, a pair of cables having their lower ends secured to opposite ends of the float upon the upper surface thereof and their upper ends passing around their appropriate drums, and a pair of cables having their lower ends secured to the float near the middle thereof and upon opposite sides and their upper ends wound upon appropriate drums therefor, the several cables adapted to transmit all the motions of the float, substantially as as set forth.

3. In a wave-power, the combination of an open structure or pier, a buoyant float exposed to the action of the waves and having a pair of cables secured to the float, power-drums journaled in the pier around which the upper ends of the cable are wound, sheaves or pulleys journaled in the pier, cables secured to the drums and passing over the sheaves, said cables having weights secured to their free ends, a second pair of cables secured to the float, drums around which said cables are wound, and counter-weights secured directly to the last-named drums, substantially as set forth.

4. In a wave-power, the combination, with a buoyant float, and with power-drums, of cables wound upon said drums and connected to said float, and guide-rollers for said cables, substantially as and for the purposes set forth.

5. In a wave-power motor, the combination of the automatically-adjusting float adapted to receive the various regular and irregular motions of the waves, of the rotary drums located within suitable bearings above the float, cables or chains connecting the float to said drums and adapted to rotate the same, and of the power-weights secured to said drums and adapted to reverse the rotation thereof, substantially as set forth and described.

6. In a wave-power motor, the combination, with a buoyant float, of the rotating drums secured above the float, connecting-cables between the float and drums, cables wound upon said drums, and weights connected thereto, said float adapted through the medium of the weights upon its upward movement by the action of the waves to rotate said drum in one direction and upon receding of the waves by gravity to overcome the weights and rotate the drum in an opposite direction, thereby giving an oscillatory motion thereto, substantially as set forth and described.

In testimony whereof I affix my signature in presence of two witnesses.

HENRY P. HOLLAND.

Witnesses:
N. A. ACKER,
CHARLES J. ARMBRUSTER.